No. 621,942. Patented Mar. 28, 1899.
W. J. PIERCE.
SPRING FRAME FOR BICYCLES.
(Application filed Mar. 3, 1898.)
(No Model.) 2 Sheets—Sheet 1.
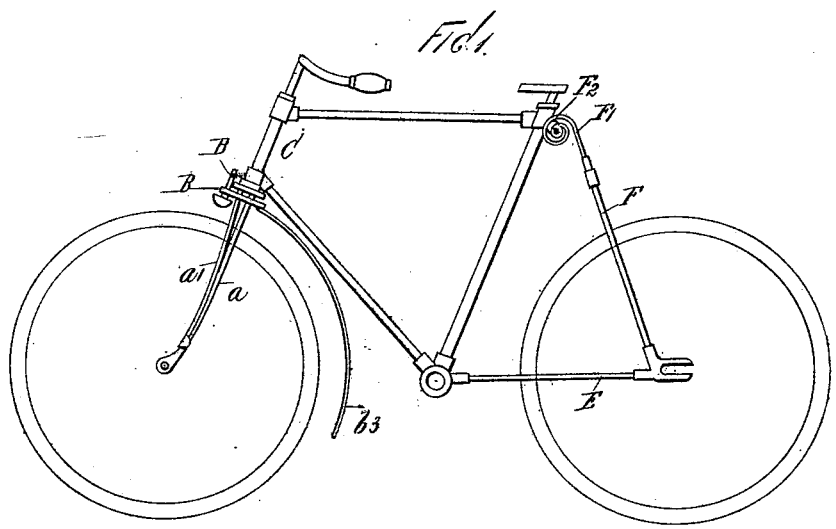
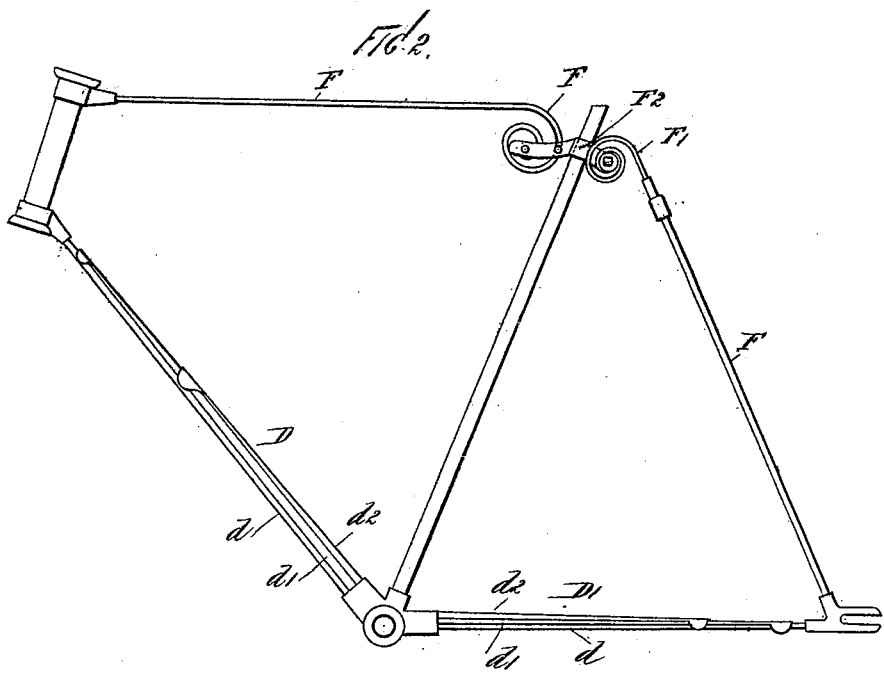
WITNESSES
Carrie C. Olsen
Wm. L. McJannett
INVENTOR
William J. Pierce,
BY
Edgar Tate & Co.
ATTORNEYS
THE NORRIS PETERS CO., PHOTO-LITHO., WASHINGTON, D. C.

No. 621,942. Patented Mar. 28, 1899.
W. J. PIERCE.
SPRING FRAME FOR BICYCLES.
(Application filed Mar. 3, 1898.)
(No Model.) 2 Sheets—Sheet 2.
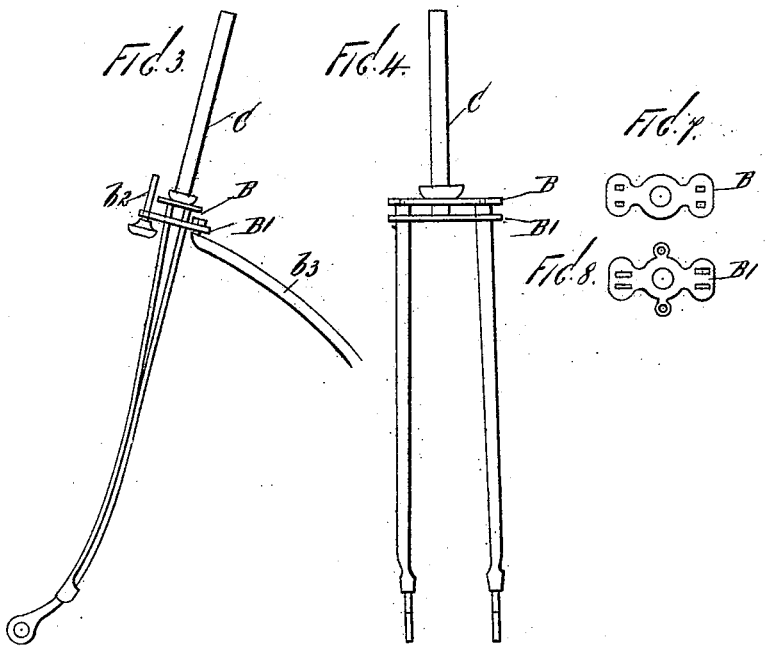
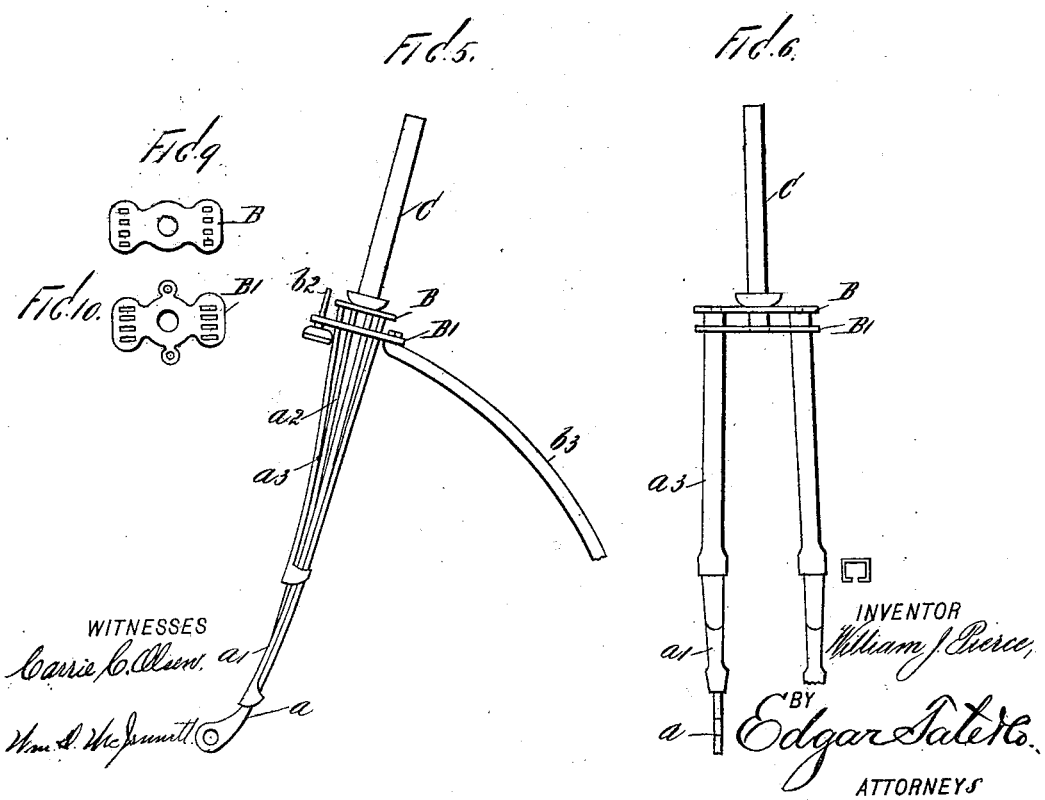

UNITED STATES PATENT OFFICE.

WILLIAM JOSEPH PIERCE, OF LONDON, ENGLAND.

SPRING-FRAME FOR BICYCLES.

SPECIFICATION forming part of Letters Patent No. 621,942, dated March 28, 1899.

Application filed March 3, 1898. Serial No. 672,438. (No model.)

*To all whom it may concern:*

Be it known that I, WILLIAM JOSEPH PIERCE, residing at 85 Aberfeldy street, Bromley by Bow, London, in the county of Middlesex, England, have invented certain new and useful Improvements in Cycle Frames, Springs, or Flexible Parts in the Construction Thereof, of which the following is a full and complete specification, such as will enable those skilled in the art to which it appertains to make and use the same, and for which I have obtained a patent in Great Britain, No. 18,675, dated August 12, 1897.

This invention relates to bicycles; and the object thereof is to provide a bicycle the frame of which is constructed in part of springs in order to reduce the vibrations or shocks experienced in riding the same upon rough or uneven roads.

The invention consists of a bicycle-frame constructed substantially as hereinafter described, and defined in the claims.

The invention is the same as that for which Letters Patent were granted in Great Britain August 12, 1897, No. 18,675, and is fully disclosed in the following specification, of which the accompanying drawings form a part, in which the separate parts of my improvement are designated by the same letters of reference in each of the views, and in which—

Figure 1 is a side view of a bicycle embodying one form of my invention. Fig. 2 is a side view of a frame, showing a modified form. Figs. 3 and 4 are side and front views, respectively, of the front fork of the frame shown in Fig. 1. Figs. 5 and 6 are similar views of the front fork of the frame shown in Fig. 2, and Figs. 7, 8, 9, and 10 are views of details.

In the drawings forming part of this specification I have shown the frame of a bicycle constructed in accordance with this invention and which may be of the ordinary or any preferred form, and in the practice of my invention the front fork is composed of a series of leaf-springs $a\ a'$, of which there may be two or more in accordance with their required strength.

The spring $a$ is provided at its lower end with suitable bearings for the shaft of the front wheel and at its upper end with a shoulder and reduced extension which is adapted to engage a suitably-slotted plate B, to which it is secured by riveting, brazing, or in any other preferred manner. For the purpose of securing additional strength and rigidity a second slotted plate B' is provided, as shown in Figs. 3 and 4, through which the springs $a\ a'$ pass. The lower plate B' may also be provided with front and back perforated projections, to which may be secured the brakes $b^2$ and mud-guard $b^3$ of any suitable construction. The spring-plate $a'$ is similar in construction to the spring-plate $a$ and is secured at its upper end in the plates B B' in the same manner. The lower end of the spring $a'$ is, however, thinned and formed into a clip, which is fitted onto and partly around the spring-plate $a$ to hold the springs together and prevent rattling.

The front tubular head C of the frame is fitted in both plates B B', as shown in Fig. 4, and secured therein by brazing or in any other preferred manner. The above construction is shown in detail in Figs. 3 and 4, while in Figs. 5 and 6 the same general construction is shown, the only difference being in the number of spring-plates, which in this form comprises $a$ and $a'$ and also $a^2$ and $a^3$. The diagonal brace D and the side braces D' (see Fig. 2) may also be constructed of a plurality of leaf-springs $d\ d'\ d^2$, which are similar in construction and arrangement to the leaf-springs $a\ a'\ a^2$ above described. It is obvious that in the place of a plurality of leaf-springs the side braces may be formed of a single spring-rod E, as shown in Fig. 1.

In order to prevent undue deflection of the side braces D' and E, two flexible stays F, Figs. 1 and 2, are provided, which consist of a piece of drawn-steel tube or other suitable metal, to the upper ends of which are secured flexible scrolls F', which have square perforations in their ends which engage square lugs arranged on the clips $F^2$, to which they are suitably secured, preferably by means of a headed bolt and nut passed through a perforation in said lugs. As shown in Fig. 2, the top brace may be constructed and secured in a similar manner to that above described in relation to the stays F.

Having fully described my invention, I claim as new and desire to secure by Letters Patent—

1. A bicycle-frame having a front fork constructed of a plurality of leaf-springs, the lower end of one of said springs provided with bearings for the front axle, the remaining springs overlapping the said spring and provided upon their lower ends with a clip adapted to engage the underlying spring, a plate secured to the upper ends of said springs and to the front tubular head of the frame, substantially as described.

2. A bicycle-frame, one of the parts of which is composed of a plurality of leaf-springs which are rigidly secured together at one end, said springs being of different lengths, and the longer spring being provided with a bearing or support, and the shorter springs being each provided at its free end with a clip which overlaps the spring adjacent thereto, substantially as shown and described.

3. A bicycle-frame constructed as herein described, the rear horizontal fork, and the member which extends from the support of the pedal-shaft upwardly to the tubular head of the frame, being composed of leaf-springs, and the upper horizontal rod and the fork which extends from the rear thereof downwardly to the support of the drive-wheel being connected with the rod which extends from the support of the pedal-shaft upwardly by spring-coils, substantially as shown and described.

4. A bicycle-frame the front fork of which, the lower rear horizontal fork, the member which extends from the support of the pedal-shaft forwardly and upwardly to the tubular head of the frame, being all composed of leaf-springs, and the rear upright fork and the upper horizontal rod of the frame being connected with the frame at their adjacent ends by scroll-springs, substantially as shown and described.

In testimony that I claim the foregoing as my invention I have signed my name, in presence of the subscribing witnesses, this 7th day of February, 1898.

WILLIAM JOSEPH PIERCE.

Witnesses:
JAMES PASCOE,
JOHN RATZER.